(12) United States Patent
Lee et al.

(10) Patent No.: US 10,738,970 B2
(45) Date of Patent: Aug. 11, 2020

(54) LIGHTING DEVICE AND VEHICLE LAMP COMPRISING SAME

(71) Applicant: LG INNOTEK CO., LTD., Seoul (KR)

(72) Inventors: Dong Hyun Lee, Seoul (KR); Seong Jin Kim, Seoul (KR); Young Jae Choi, Seoul (KR); Sa Rum Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/728,720

(22) Filed: Dec. 27, 2019

(65) Prior Publication Data
US 2020/0132273 A1 Apr. 30, 2020

Related U.S. Application Data

(63) Continuation of application No. 16/540,572, filed on Aug. 14, 2019, now Pat. No. 10,563,840, which is a
(Continued)

(30) Foreign Application Priority Data

Dec. 2, 2015 (KR) .......................... 10-2015-0170372

(51) Int. Cl.
*F21V 7/00* (2006.01)
*F21V 5/00* (2018.01)
(Continued)

(52) U.S. Cl.
CPC .............. F21V 7/0033 (2013.01); B60Q 3/00 (2013.01); F21S 43/14 (2018.01); F21S 43/15 (2018.01);
(Continued)

(58) Field of Classification Search
CPC .. G02B 6/0053; G02B 6/0036; G02B 6/0055; F21S 43/40; F21S 43/14; F21S 43/15;
(Continued)

(56) References Cited

U.S. PATENT DOCUMENTS

| 6,414,801 B1 | 7/2002 | Roller |
| 10,527,250 B2 * | 1/2020 | Cho ........................ F21V 11/00 |

(Continued)

FOREIGN PATENT DOCUMENTS

| CN | 203404725 U | 1/2014 |
| CN | 103858048 A | 6/2014 |

(Continued)

OTHER PUBLICATIONS

International Search Report in International Application No. PCT/KR2016/014143, filed Dec. 2, 2016.

(Continued)

*Primary Examiner* — Anabel Ton
(74) *Attorney, Agent, or Firm* — Saliwanchik, Lloyd & Eisenschenk

(57) ABSTRACT

An embodiment of the present invention relates to a lighting device comprising: a light source unit comprising a plurality of light emitting elements; a conversion unit for converting light emitted from the light source unit; a reflection unit for reflecting light which has passed through the conversion unit; and a half mirror member, which is disposed on the top of the reflection unit, for transmitting a portion of incident light and reflecting a portion of the incident light. The conversion unit includes an optical pattern for selectively transmitting light emitted from the light source unit, the light source unit is disposed on a periphery portion of the reflection unit, and the height of the center portion of the reflection unit is greater than the height of the periphery portion thereof.

15 Claims, 11 Drawing Sheets

Related U.S. Application Data continuation of application No. 15/780,186, filed as application No. PCT/KR2016/014143 on Dec. 2, 2016, now Pat. No. 10,422,505.

(51) Int. Cl.

| | | |
|---|---|---|
| *F21V 13/12* | (2006.01) | |
| *F21S 43/15* | (2018.01) | |
| *F21V 11/00* | (2015.01) | |
| *B60Q 3/00* | (2017.01) | |
| *F21S 43/31* | (2018.01) | |
| *F21S 43/14* | (2018.01) | |
| *F21S 43/40* | (2018.01) | |
| *F21V 11/16* | (2006.01) | |
| *F21V 7/04* | (2006.01) | |
| *F21Y 115/10* | (2016.01) | |
| *F21Y 103/10* | (2016.01) | |
| *F21Y 105/00* | (2016.01) | |

(52) U.S. Cl.
CPC ............... *F21S 43/31* (2018.01); *F21S 43/40* (2018.01); *F21V 5/002* (2013.01); *F21V 7/005* (2013.01); *F21V 7/0008* (2013.01); *F21V 11/00* (2013.01); *F21V 11/16* (2013.01); *F21V 13/12* (2013.01); *F21V 7/041* (2013.01); *F21V 7/043* (2013.01); *F21Y 2103/10* (2016.08); *F21Y 2105/00* (2013.01); *F21Y 2115/10* (2016.08)

(58) Field of Classification Search
CPC ...... F21V 7/0033; F21V 7/0008; F21V 7/005; F21V 7/002; F21V 11/00; F21V 11/16; F21V 13/12
See application file for complete search history.

(56) References Cited

U.S. PATENT DOCUMENTS

| | | |
|---|---|---|
| 2002/0053878 A1 | 5/2002 | Masaki et al. |
| 2003/0003352 A1 | 1/2003 | Kweon et al. |
| 2003/0174514 A1 | 9/2003 | Natsume |
| 2004/0008516 A1 | 1/2004 | Amano |
| 2005/0078486 A1 | 4/2005 | Kawaguchi |
| 2011/0149535 A1 | 6/2011 | Dubosc |
| 2012/0274462 A1 | 11/2012 | Martinez et al. |
| 2013/0143350 A1 | 6/2013 | Yriberri et al. |
| 2014/0055994 A1 | 2/2014 | Kang et al. |
| 2015/0062946 A1 | 3/2015 | Fukai et al. |
| 2015/0219908 A1 | 8/2015 | Lee et al. |
| 2017/0355302 A1 | 12/2017 | Kuramitsu et al. |

FOREIGN PATENT DOCUMENTS

| | | |
|---|---|---|
| JP | 2005-202145 A | 7/2005 |
| JP | 2006-091104 A | 4/2006 |
| KR | 10-2010-0113149 A | 10/2010 |
| KR | 10-2013-0065480 A | 6/2013 |
| KR | 10-2015-0091841 A | 8/2015 |
| WO | WO 2009/095866 A1 | 8/2009 |
| WO | WO-2013/019023 A2 | 2/2013 |

OTHER PUBLICATIONS

Supplementary European Search Report dated Jul. 31, 2018 in European Application No. 16871096.0.
Office Action dated Jan. 11, 2019 in U.S. Appl. No. 15/780,186.
Notice of Allowance dated May 14, 2019 in U.S. Appl. No. 15/780,186.
Office Action dated Dec. 2, 2019 in Chinese Application No. 201680070600.2.
Notice of Allowance dated Oct. 2, 2019 in U.S. Appl. No. 16/540,572.

* cited by examiner

LIGHTING DEVICE AND VEHICLE LAMP COMPRISING SAME

CROSS-REFERENCE TO RELATED APPLICATIONS

This application is a continuation of U.S. application Ser. No. 16/540,572, filed Aug. 14, 2019; which is a continuation of U.S. application Ser. No. 15/780,186, filed May 30, 2018, now U.S. Pat. No. 10,422,505, issued Sep. 24, 2019; which is the U.S. national stage application of International Patent Application No. PCT/KR2016/014143, filed Dec. 2, 2016, which claims priority to Korean Application No. 10-2015-0170372, filed Dec. 2, 2015, the disclosures of each of which are incorporated herein by reference in their entirety.

TECHNICAL FIELD

The present invention relates to a technology for implementing a three dimensional optical image.

BACKGROUND ART

Light emitting elements including light emitting diodes (LEDs) are being applied to various kinds of lighting.

The lighting is being generally applied in a variety of ways, such as to increase illumination in a limited area, have a uniform luminous efficiency, or adjust the brightness of vehicle lighting needed for a predetermined lighting regulation.

There is an increasing need for utilization of a light emitting element which may be formed to have various shapes or three dimensional effects in consideration of a design aspect rather than a need for utilization of a light emitting element as a two dimensional flat light element in applications of general-purpose lighting.

DISCLOSURE

Technical Problem

The present invention is directed to providing a lighting device capable of implementing various optical images by operation of a half mirror member and operation of a reflective member configured to reflect light emitted by a light source, and the number of light sources is decreased.

Technical Solution

One aspect of the present invention provides a composite lighting device including a light source having a plurality of light emitting elements, a first three dimensional light forming part having a reflection unit configured to reflect and guide light emitted by the light source, and a second three dimensional light forming part, which has a half mirror member configured to transmit or reflect a portion of light reflected by the reflection unit and a three dimensional structure in which a height of a central portion of the reflection unit is higher than that of an edge of the reflection unit, disposed above the reflection unit.

Advantageous Effects

According to the embodiment of the present invention, there are effects that a lighting device can generate an optical image having various three dimensional shapes using a half mirror member and a reflection unit which reflects light to change a path thereof, and various functions of a two dimensional light source can also be performed even when the number of light sources is significantly decreased.

MODES OF THE INVENTION

Figure 1:
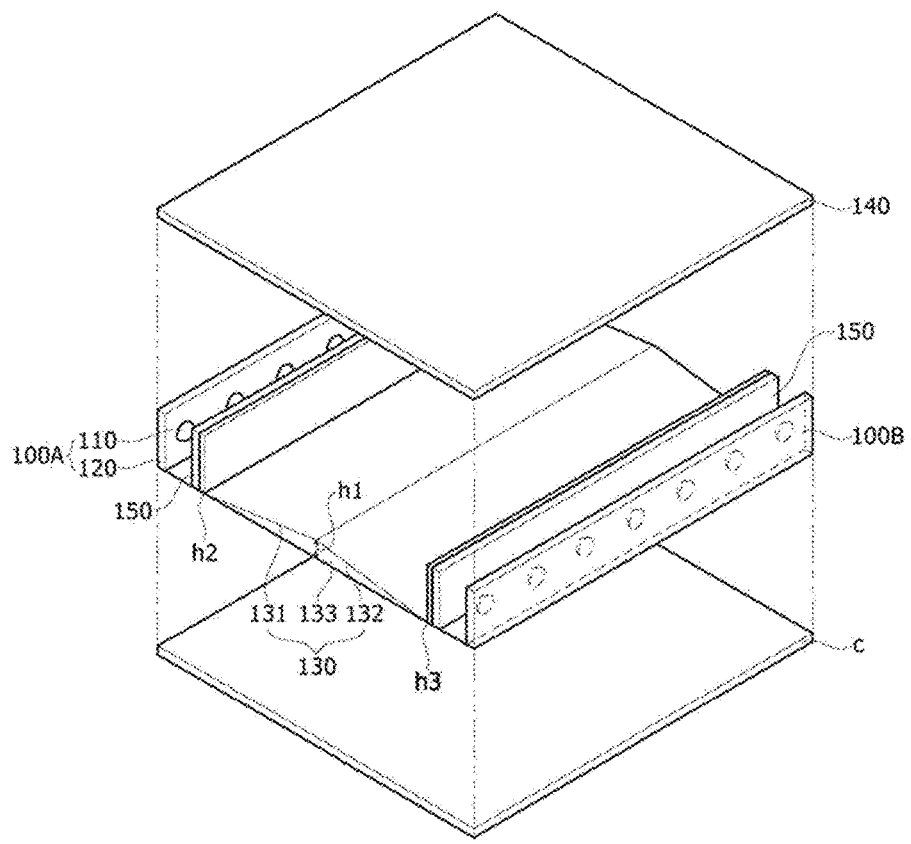
FIG. 1 is a conceptual exploded perspective view illustrating a lighting device according to an embodiment of the present invention.

A configuration and operations of the present invention will be described below in further detail with reference to exemplary embodiments of the present invention. When the present invention is described with reference to the accompanying drawings, components that are the same regardless of reference numerals will be referred to by the same reference numerals, and redundant descriptions thereof will be omitted. While terms "first," "second," etc. may be used to describe various components, such components may not be limited to the above terms. The above terms are used only to distinguish one component from another component.

Figure 2:
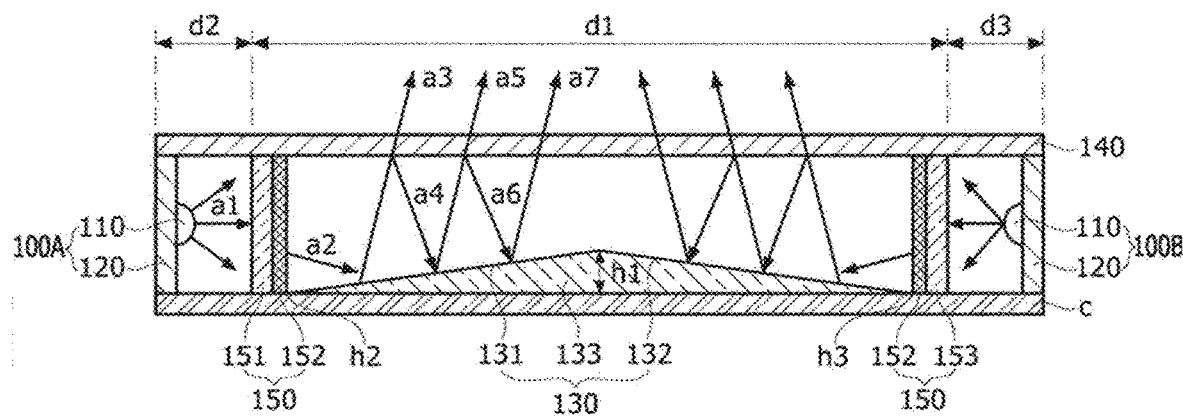
FIG. 2 is a conceptual view illustrating a coupling cross section of FIG. 1.

FIG. 1 is a conceptual exploded perspective view illustrating a lighting device according to an embodiment of the present invention, and FIG. 2 is a conceptual view illustrating a coupling cross section of FIG. 1.

Referring to FIGS. 1 and 2, the lighting device according to the embodiment of the present invention includes light sources 100A and 100B having a plurality of light emitting elements 110, a first three dimensional light forming part having a reflection unit 130 configured to reflect and guide light emitted from the light sources 100A and 100B, and a second three dimensional light forming part disposed above the reflection unit 130 and having a half mirror member 140 configured to transmit and reflect a portion of light reflected by the reflection unit.

The first three dimensional light forming part may include a frame of the reflection unit 130 and may further include conversion units 150 disposed at both sides or one side of the reflection unit 130. Particularly, in this case, the reflection unit 130 according to the embodiment of the present invention may have a three dimensional structure in which a height h1 of a central portion is higher than heights h2 and h3 of edge portions.

In the lighting device according to the embodiment of the present invention having the above-described structure, light passing through the conversion unit 150 is guided upward by being reflected by a surface of the reflection unit 130, and then various optical images may be generated by the half mirror member 140 configured to transmit a portion of light and reflect the remaining light.

The light sources 100A and 100B may be disposed in a longitudinal direction of the reflective member 140, the light emitting elements 110 may be mounted on printed circuit boards 120, and the plurality of light emitting elements may be disposed to be spaced apart from each other in one direction.

In the embodiment, the light emitting elements 110 may be disposed on a housing C to emit light toward an inclined surface of the reflective member 140 as illustrated in the drawings. The light emitting element 110 may include any one selected from among a light emitting diode (LED), an organic LED (OLED), a laser diode (LD), a laser, and a vertical-cavity surface-emitting laser (VCSEL). In the embodiment of the present invention, the light emitting element is exemplarily illustrated as an LED.

As illustrated in FIGS. 1 and 2, a first light source 100A and a second light source 100B may be disposed adjacent to both edges of the reflection unit 130 with respect to the central portion of the reflection unit 130.

The conversion units 150 may be interposed between the reflection unit 130 and the first light source 100A, and between the reflection unit 130 and the second light source 100B. In this case, light al emitted by the light sources 100A and 100B may reach the reflection unit 130 via the diffused light conversion units 150.

In the embodiment, the light sources are exemplarily illustrated to be disposed at both sides of the reflection unit 130, but are not limited thereto, and the light source may be disposed at only one side of the reflection unit.

Hereinafter, a configuration and a function of the present invention will be described on the basis of the first light source 100A disposed at one side thereof because the light sources 100A and 100B have the same configuration and perform the same function.

In a case in which the first light source 100A emits light, the light may pass through the conversion unit 150. As illustrated, the light source 100A is spaced apart from the conversion unit 150, and an air layer is formed between the both components, but in another embodiment, a gap between the both components may be filled with a resin layer.

The conversion unit 150 may include a diffusion member 151 configured to diffuse light emitted by the light emitting element 110 and an optical pattern member 152 disposed on one surface of the diffusion member 151.

The diffusion member 151 performs a function of diffusing light, and any sheet or member having a known diffusion function may be used as the diffusion member 151. As an example, a synthetic resin having high light transmittance may be applied as the diffusion member 151, and polyethyleneterephthalate, polyethylene naphthalate, acrylic resin, colicarbonate, polystyrene, polyolefin, cellulose acetate, weather-resistant vinyl chloride, or the like may be applied as the diffusion member 151, but the diffusion member 151 is not limited thereto. In addition, a material capable of having a diffusion function such as acrylic, polymethyl methacrylate (PMMA), cyclic olefin copoly (COC), polyethylene terephthalate (PET), and high permeability plastics such as a resin may be applied as the diffusion member 151.

The optical pattern member 152 images a shape of light emitted by the light emitting element 110, and an optical pattern for imaging various shapes of light may be formed on the optical pattern member 152. As an example, the optical pattern member 152 may generate various shapes of light by forming fine slit patterns in a sheet having a reflective property to transmit a portion of the light through the slit patterns, or by using a translucent material having a shape of an optical pattern to transmit a portion of the light through the translucent material.

The reflection unit 130 may have a structure in which a thickness decreases from the central portion of the reflection unit (the height h1 which is an upper reference point) toward the edges (the heights h2 and h3). Particularly, the reflection unit 130 may have a three dimensional structure including a first side surface 131 configured to reflect light emitted by the first light source 100A, and a second side surface 132 configured to reflect light emitted by the second light source 100B.

Figure 3A:
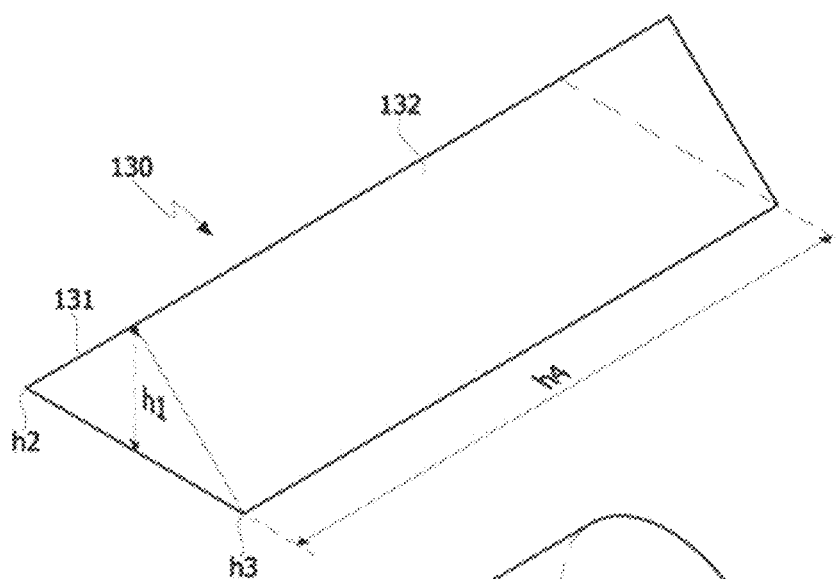
FIGS. 3A-3C are views illustrating various shapes of a reflection unit according to an embodiment of the present invention.
Figure 3B:
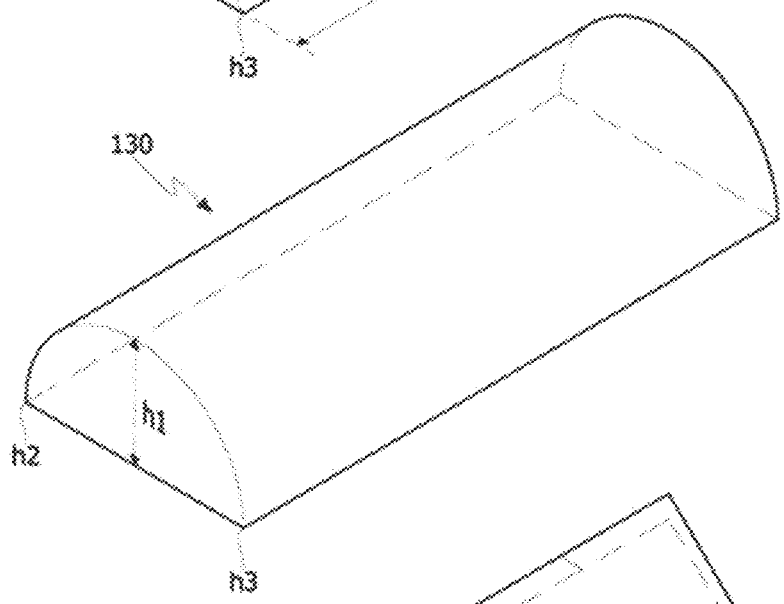
Figure 3C:
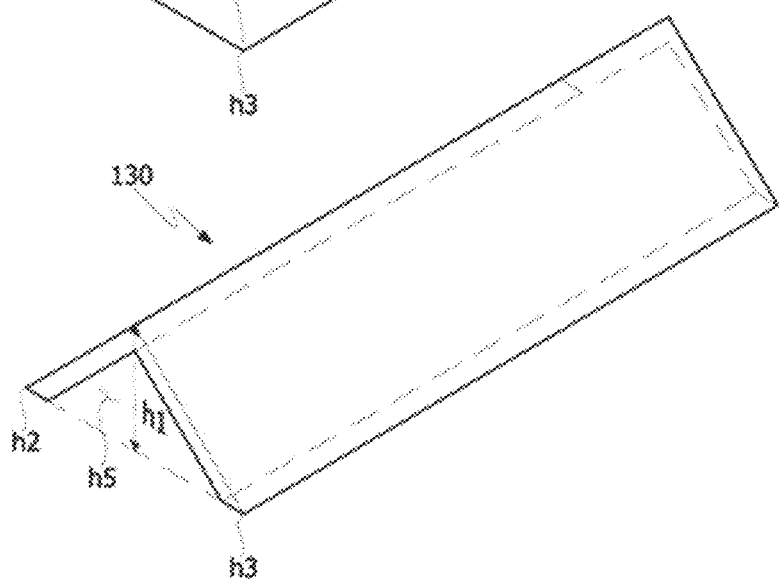

Accordingly, as illustrated in FIGS. 3A-3C, the reflection unit 130 according to the embodiment of the present invention may be implemented to have a three dimensional structure having a width and a length, wherein the first side surface is in contact with the second side surface at the central portion of the reflection unit, and each of the first side surface and the second side surface may have a structure of a flat or curved surface. In addition, the reflection unit may be implemented to have a structure allowed to be filled with a material or a hollow structure as illustrated in FIG. 3C.

In addition, the reflection unit 130 may be formed of a reflective material having a reflective property or may also be formed of a separate material with a reflective material applied on a surface of the reflection unit 130. A metal layer such as Ag having a high reflective property may be used as the reflective material, or a surface of a metal or synthetic resin material may be coated with a reflective material layer formed of $TiO_2$, $CaCo_3$, $BaSo_4$, $Al_2O_3$, silicon, polystyrene (PS), or the like to form the reflective material. In addition, a surface of a metal or synthetic resin material may be coated with titanium oxide, aluminum oxide, zinc oxide, lead carbonate, barium sulfate, or calcium carbonate to form the reflective material, or a synthetic resin layer including the above-describe material may be formed as the reflective material. In addition, any one among aluminum (Al), polycarbonate (PC), polypropylene (PP), acrylonitrile butadiene styrene (ABS), and polybutylene terephthalate (PBT) having a reflective property may also be used to form the reflective material.

In addition, as another example of the reflective material, the reflective material may be formed as a film type, and may be formed by including a synthetic resin containing a dispersed white pigment to implement improvement of a light reflective property and a light dispersion property. For example, titanium oxide, aluminum oxide, zinc oxide, lead carbonate, barium sulfate, calcium carbonate, or the like may be used as the white pigment, and polyethyleneterephthalate, polyethylene naphthalate, acrylic resin, colicarbonate, polystyrene, polyolefin, cellulose acetate, weather-resistant vinyl chloride, or the like may be used as the synthetic resin, but the white pigment and the synthetic resin are not limited thereto.

An operating principle of the lighting device according to the embodiment of the present invention will be described with reference to FIG. 2.

Referring to FIG. 2, the conversion unit 150 may be disposed adjacent to an outer side of the reflection unit 130. In this case, a concept of "being disposed adjacent to" includes a concept in which the reflection unit 130 and the conversion unit 150 are pressed against each other or are disposed to be spaced by a predetermined distance. However, in the case of the lighting device, the lighting device may further include the external housing C accommodating the light sources 100A and 100B, the reflection unit 130, and the conversion unit 150 therein.

For example, light a1 emitted by the first light source 100A may pass through the conversion unit 150 and diffuse to be shaped into an image patterned by the optical pattern member 152. Then, the light shaped into the image may be reflected by the first side surface 131 of the reflection unit 130.

A portion a3 of the light penetrates the half mirror member 140 disposed at an upper portion of the housing C, and the remaining portion a4 of the light may return to the reflection unit 130. Then, the light may be continuously reflected while a portion of the light penetrates the half mirror member 140 and the remaining portion of the light is reflected by the half mirror member 140 (a5 to a7) to generate a plurality of optical images (see FIG. 4A to FIG. 4C).

In the embodiment of the present invention, the reflection unit 130 may realize such a repeated reflection process to maximize light use efficiency, and the reflection unit 130 and the half mirror member may also generate a plurality of optical images.

The half mirror member 140 may include a member formed of a material which transmits a portion of light and reflects the remaining portion of the light. As an example, the half mirror member may include a film member having a structure in which a metal layer is deposited on a base material. The base material may be one of various synthetic resin films, and the metal layer may be formed by depositing or applying a depositable metal material, such as Ni, Cr, Al, or Ti, on a film material. The half mirror member is a general member which transmits a portion of light and reflects the remaining portion of the light.

In addition, in order to increase optical reflection efficiency, an uppermost portion of the central portion of the reflection unit 130 may be disposed to be spaced apart from a lower surface of the half mirror member 140. In addition, in order to increase light use efficiency and support the half mirror member 140, a structure having an upper portion of the conversion unit 150 in contact with the half mirror member 140 may be realized.

Furthermore, in a structure shown in FIG. 2, in consideration of a first region d1 corresponding to a width of the reflection unit 130 and a second region d2 corresponding to a space between the conversion unit and the lighting unit, the half mirror member 140 may be disposed to cover upper surfaces of the first region d1 and the second region d2.

In this case, various optical images may be generated as three dimensional images in the first region d1 as described above, and surface lighting may be performed in the second region d2, and thus composite lighting may also be realized. In the embodiment of the present invention, the term "three dimensional light" is defined as that an image of light emitted by a light emitting surface of the lighting device is generated to have a predetermined feeling of depth or volume.

In addition, in a case in which the half mirror member is disposed on the upper surface of the first region d1 and a second diffusion member is additionally disposed on the second region d2, surface lighting efficiency in the second region may be further increased. In such an arrangement structure, there is an advantage in that light use efficiency may be maximized because lighting is performed by even the upper portion of the second region when one light source is used.

In the embodiment, a plurality of light components emitted by a plurality of light sources may be converted into a predetermined image by the diffusion member 151 and the optical pattern member 152. For example, when the optical pattern is a plurality of holes each having a triangular shape, light which passes through the optical pattern member 152 may be converted into an image in which a plurality of triangular shapes are disposed in a longitudinal direction of the optical pattern. Then, the light converted by the optical pattern member 152 may have a feeling of depth due to the half mirror member 140.

Figure 4A:
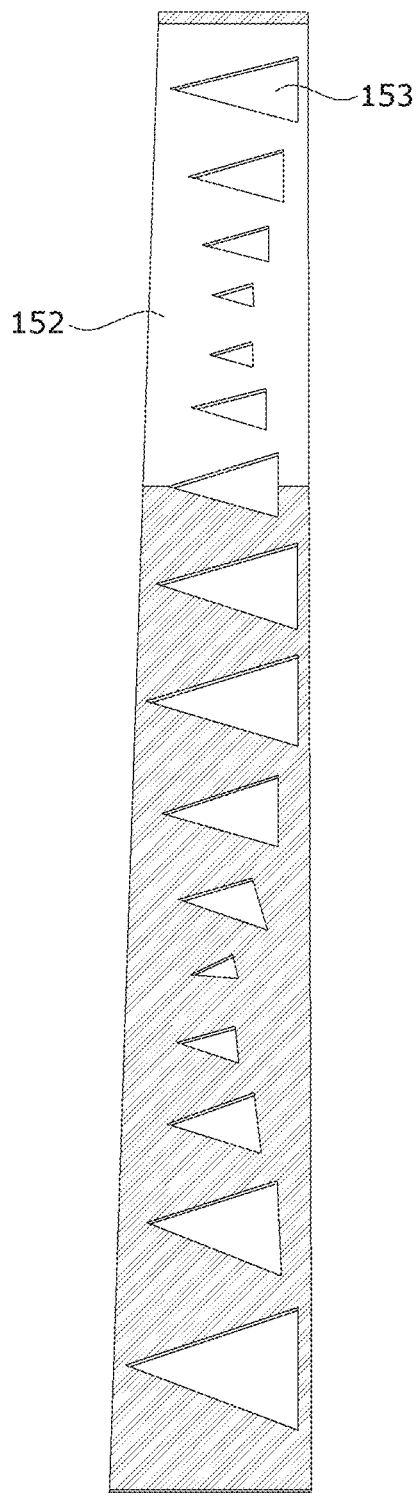
FIG. 4A is an image showing a shape of an optical pattern member.
Figure 4B:
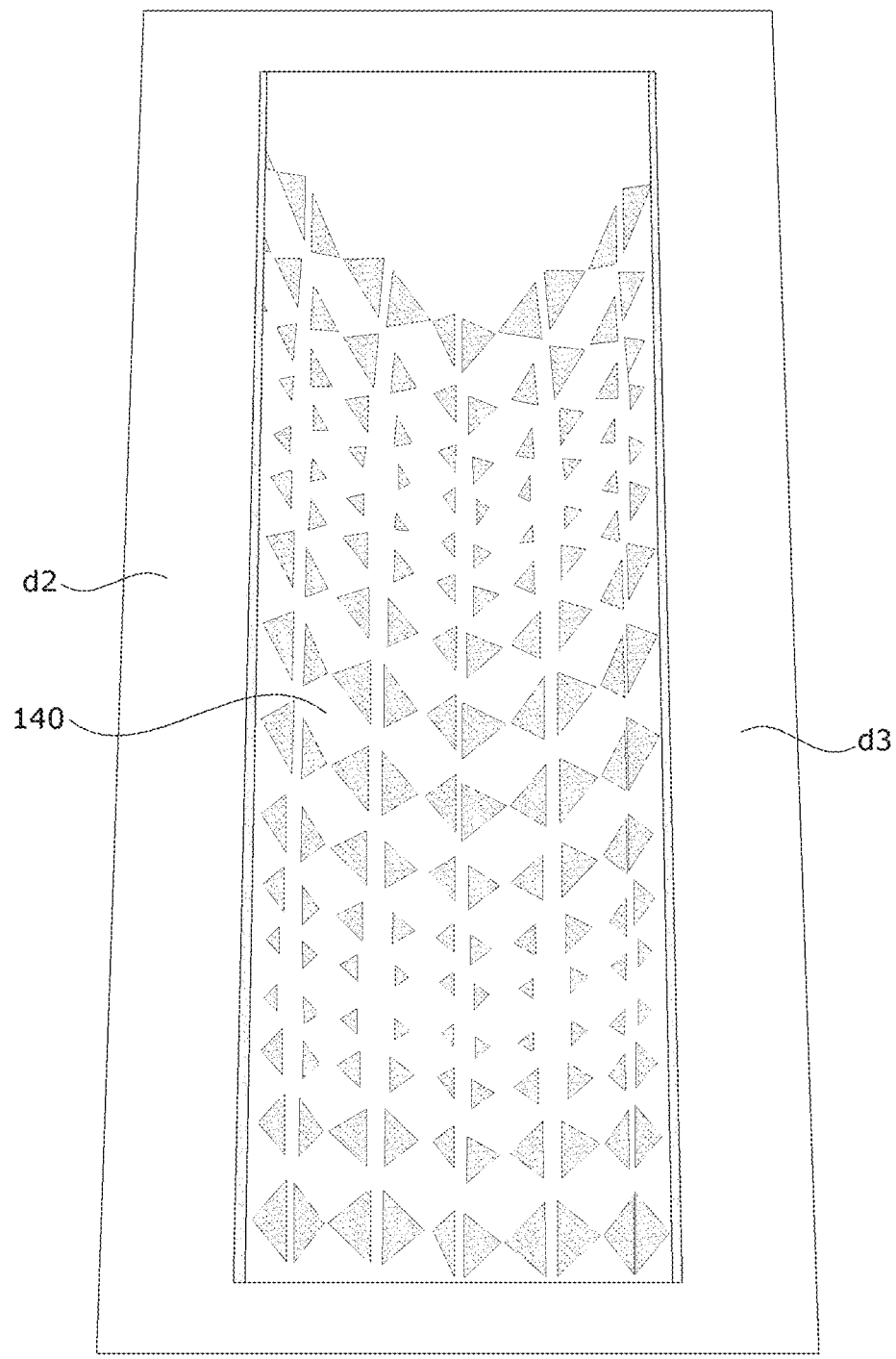
FIG. 4B is an image showing a front view of the lighting device in which an image is generated.
Figure 4C:
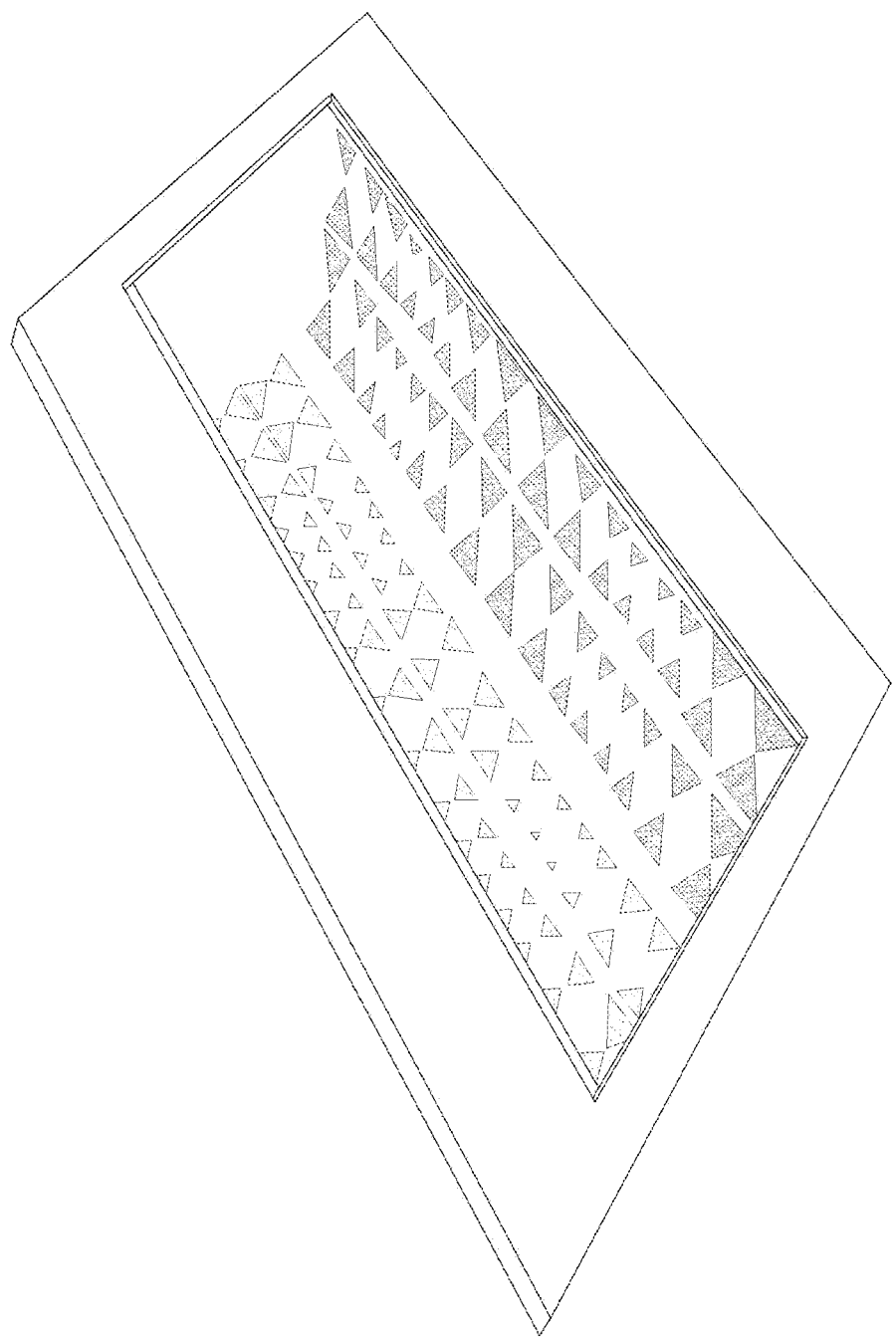
FIG. 4C is an image showing a side view of the lighting device in which the image is generated.

FIGS. 4A to 4C are images showing examples in which the lighting device having the structure of FIG. 2 is formed according to the embodiment.

Referring to FIGS. 4A to 4C and 2, in the example of the optical pattern member 152 of FIG. 4A, the optical pattern 153 is formed to have a penetrating structure or a transparent structure that light may penetrate, and other portions thereof are formed to have a structure including a shielding or reflective material. A shape of the optical pattern is not limited particularly. For example, the shape of the optical pattern may be a polygonal shape, such as a triangular shape and a tetragonal shape, or a circular shape.

FIG. 4B is an image of the lighting device when the lighting device is turned on and viewed from an upper front of the half mirror member 140 in a case in which the lighting device is formed to have the structure of FIG. 2. A shape of an optical image of which lateral sides are entirely connected and have curvatures in a depth direction may be realized by adjusting the optical pattern members disposed at the left and right sides, the central portion, and inclination angles and heights of the edges of the reflection unit.

The light source is disposed at a lower portion of the second region d2, and even in a case in which a minimum number of lighting elements having LEDs are turned on at a thin printed circuit board, a depth feeling deeper than a total thickness of the lighting device may be felt, and various optical patterns may be realized as illustrated in the drawing.

Even in the case of a side view of the lighting device as illustrated in FIG. 4C, a depth feeling may be felt, and accordingly, even in a case in which a minimum number of light sources are used in the lighting device according to the present embodiment, an optical pattern by which a plurality of three dimensional effects are realized may be provided.

Figure 5A:
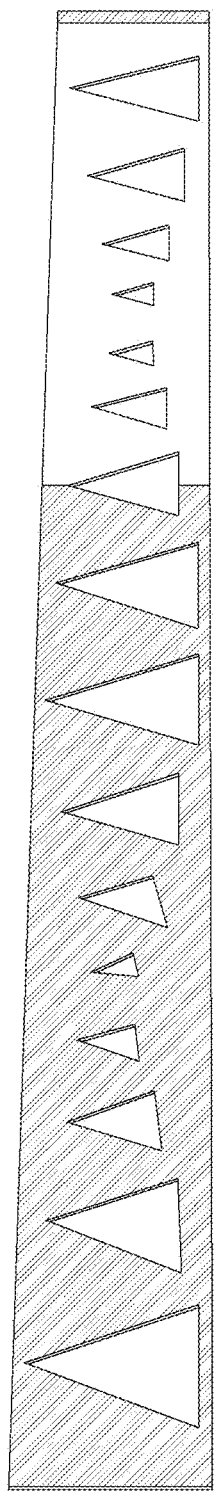
FIG. 5A is an image showing a shape of the optical pattern member.
Figure 5B:
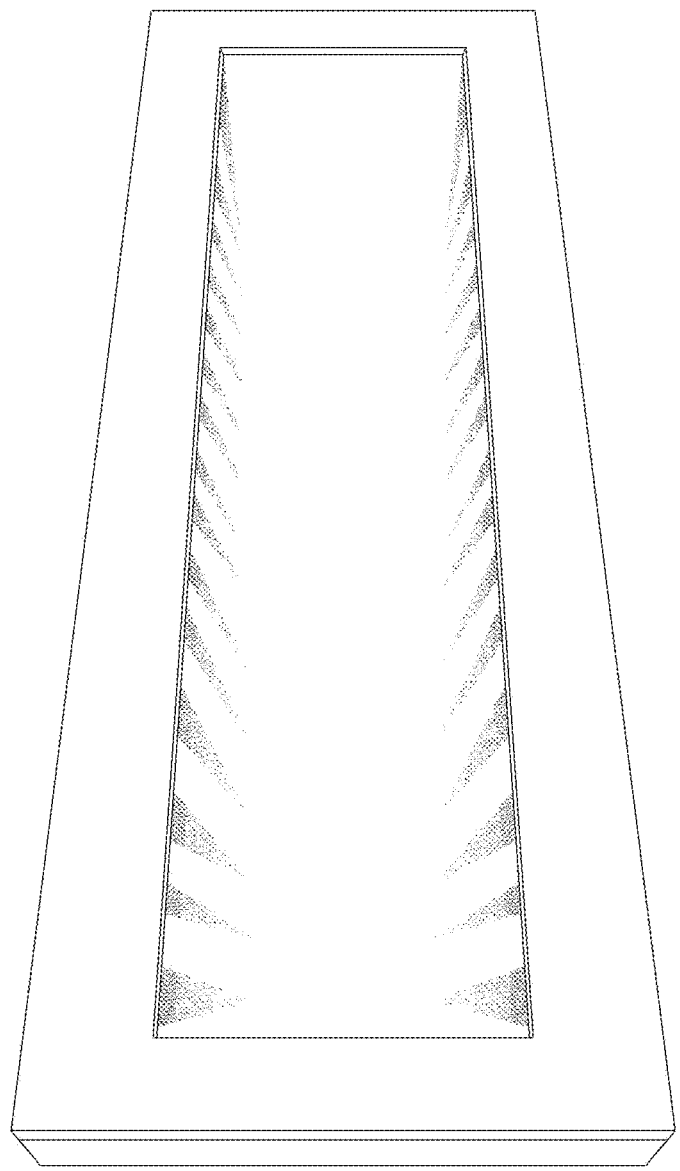
FIG. 5B is an image showing the lighting device, in which the image is generated, seen from a first angle.
Figure 5C:
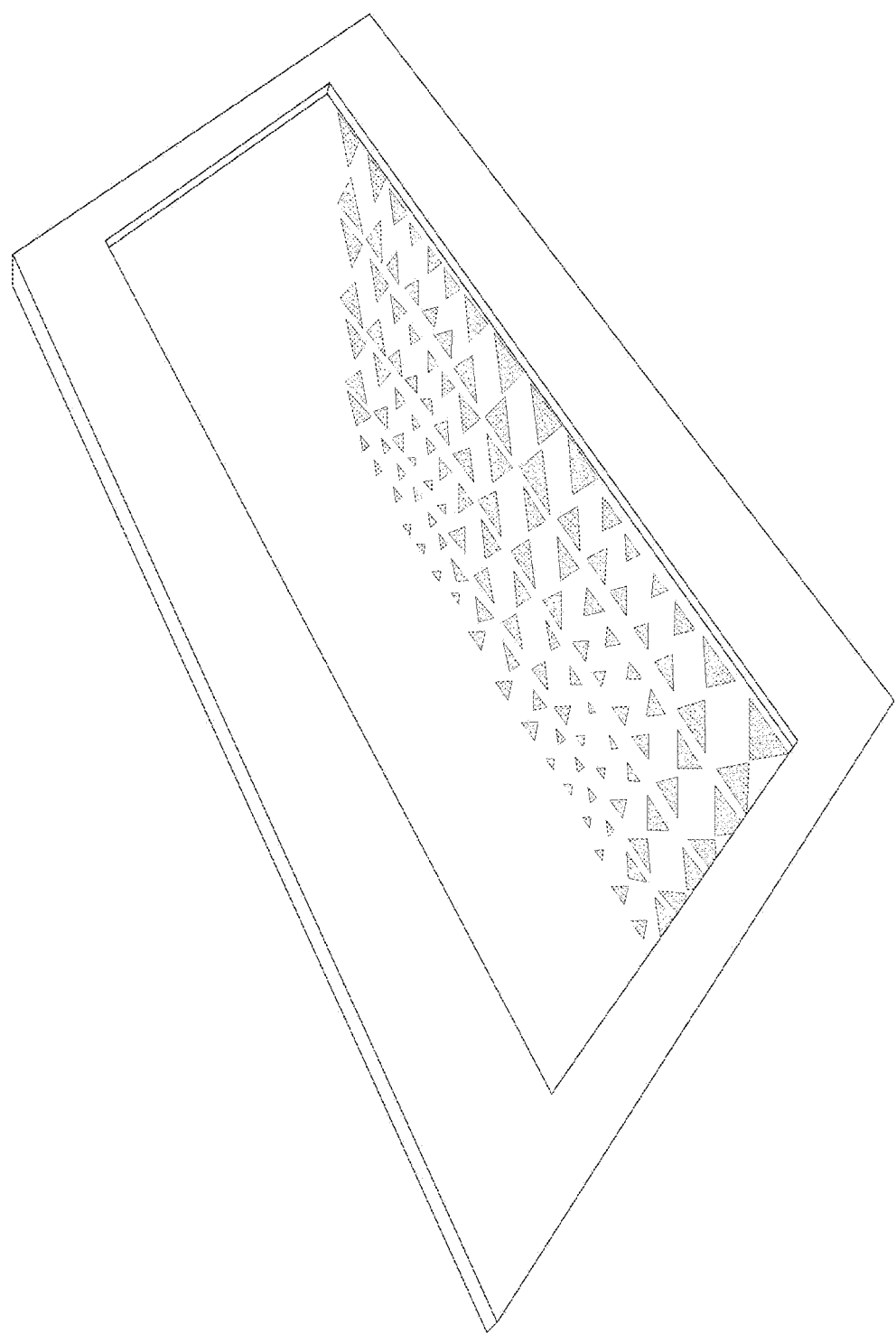
FIG. 5C is an image showing the lighting device, in which the image is generated, seen from a second angle.
Figure 5D:
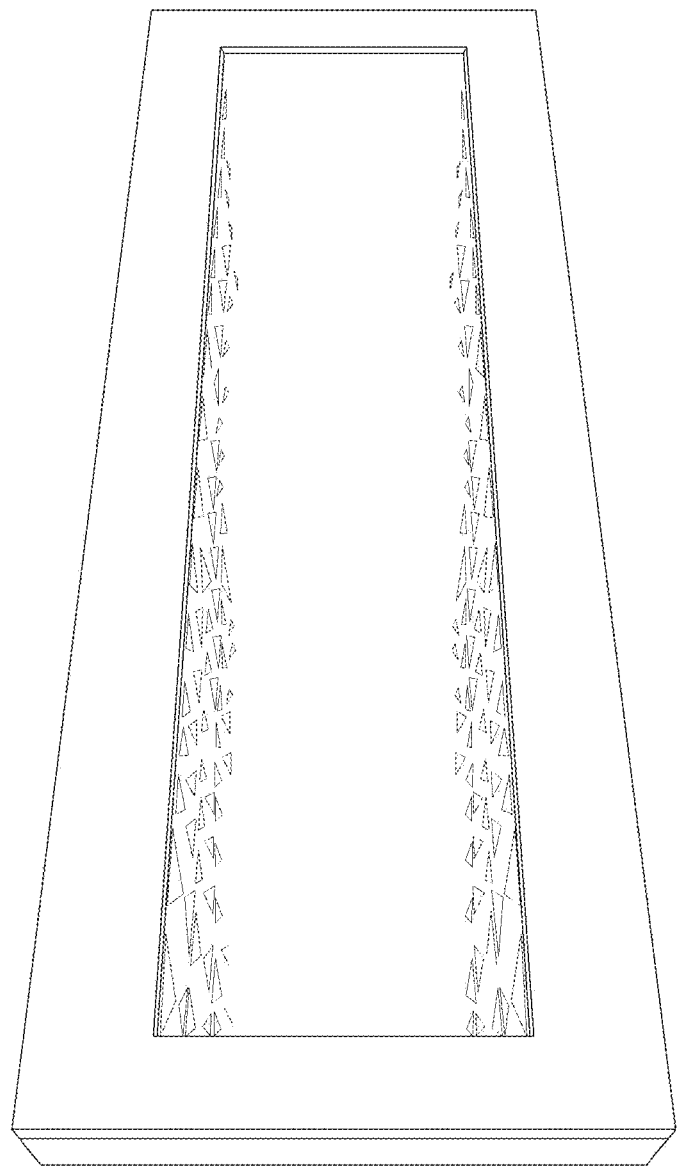
FIG. 5D is an image showing the lighting device, in which the image is generated, seen from the first angle.

FIGS. 5A to 5D illustrate examples of felt depth feelings in cases in which the reflection unit 130 of the present invention having the structure shown in FIG. 2 has a structure in which a height of the central portion is almost similar to that of the edges so that the reflection unit 130 is substantially flat, that is, an inclination angle formed by the central portion, the edges, and a lower flat surface of the reflection unit ranges from 150° to 180°. In a case in which an angle of the reflection unit is wide, left and right optical images which are not connected and descend in a depth direction may be realized. In addition, even in a case in which the optical patterns are formed to be the same, an image in which light continues in a depth direction of the lighting device may be realized as the inclination angle of the reflection unit is decreased. Such a three dimensional feeling may be variously felt according to a direction from which the lighting device is seen as illustrated in FIGS. 5B to 5D.

Figure 6:
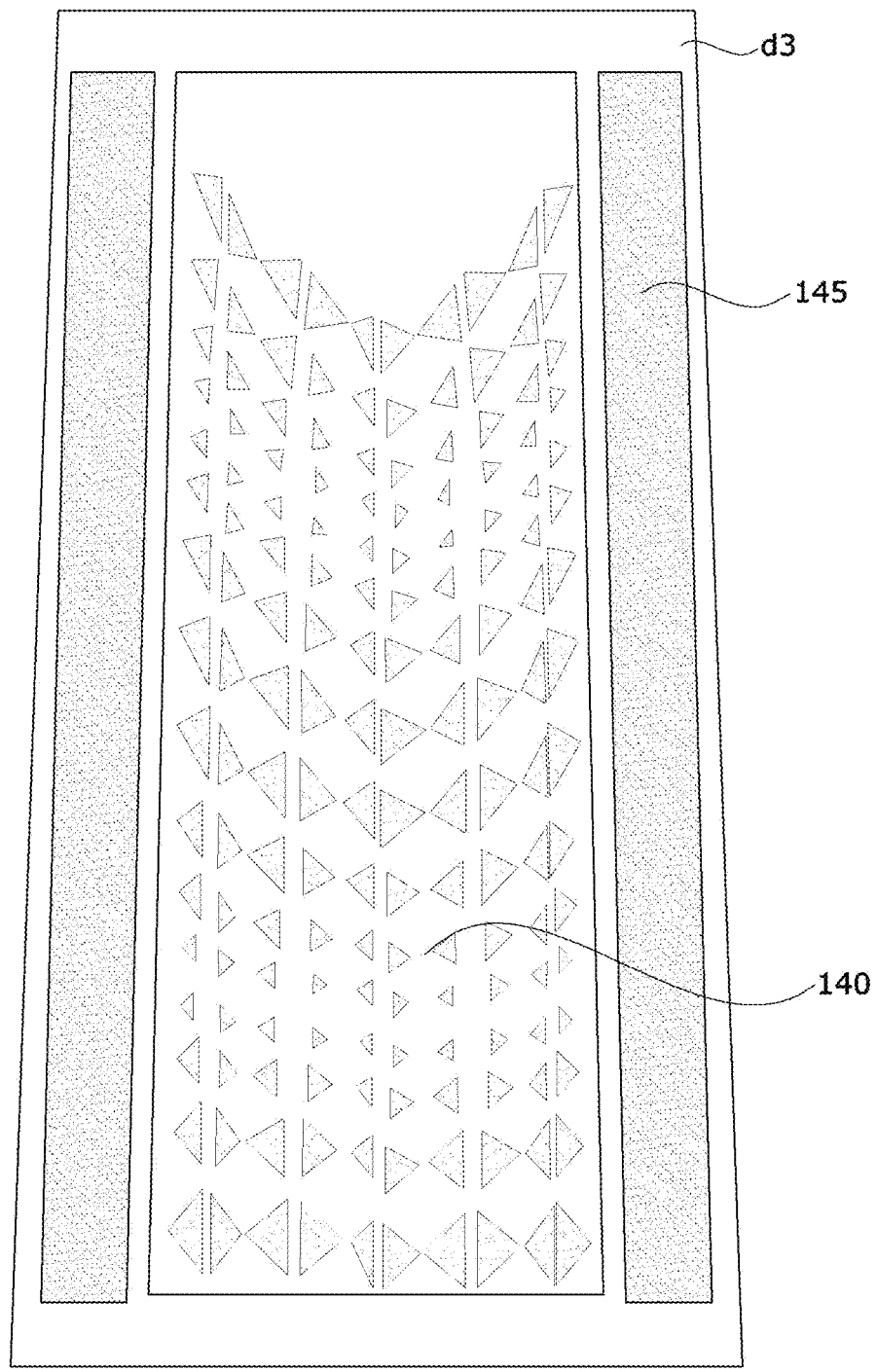
FIGS. 6 and 7 are images showing examples in which the lighting device is formed according to the embodiment of the present invention.

FIG. 6 is an image of the lighting device when a first diffusion member 145 is disposed at portions of the second regions d2 and d3 instead of the half mirror member 140 of FIG. 2 or a diffusion member is stacked on an upper surface of the half mirror member. As illustrated in the drawing, a three dimensional optical image may be realized in the first region d1, surface lighting may be performed from the second region, and thus various lighting effects may be obtained.

In addition, a second optical member for implementing three dimensional light may also be disposed at the second regions d2 and d3. The second optical member may be a light transmission sheet member having an embossed pattern on a surface of a material and may generate a three dimensional optical image of a portion of light, which is directly transmitted upward and not transmitted toward the conversion unit 150, emitted by the light source.

Figure 7:
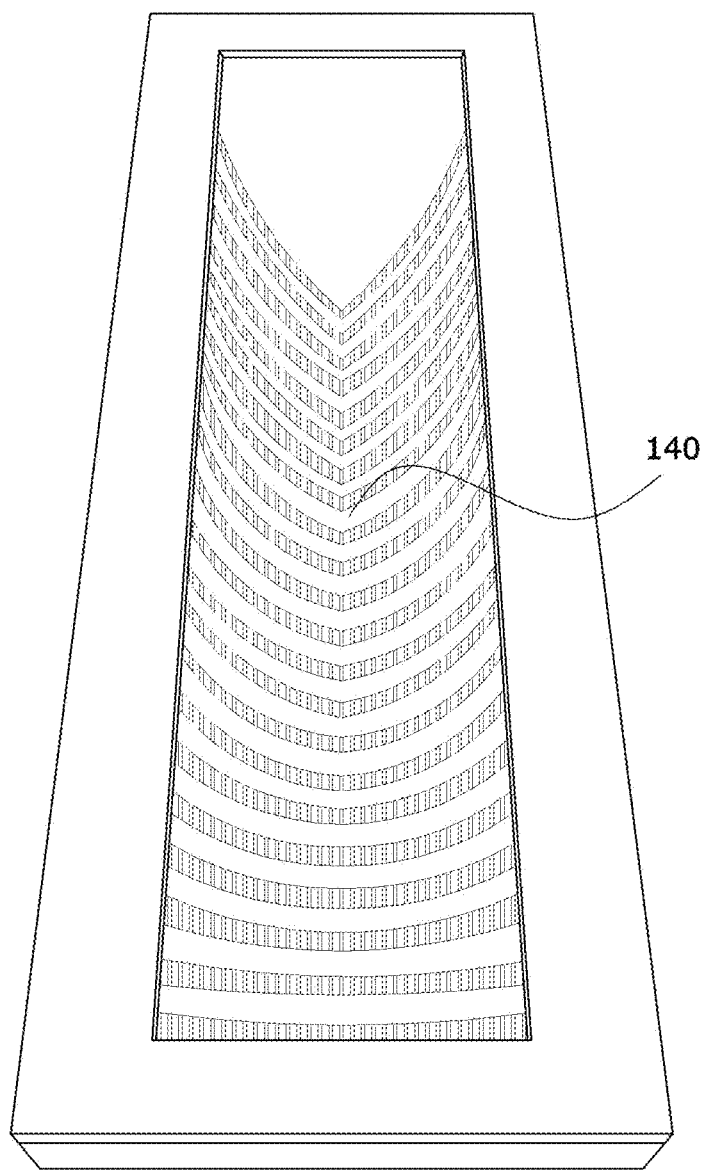

In addition, as illustrated in FIG. 7, an image of light emitted from a point light source shown in the half mirror member 140 may also be generated as an image of a plurality of point light sources.

In various embodiments of the present invention, as transmissivity of the half mirror member is decreased, the number of generated illusions of light is increased. This is because an amount of light reflected toward an inside of the lighting device by the half mirror member is increased so that the number of repeated reflections in the lighting device is increased. Accordingly, since the half mirror member configured to reflect light guided by the reflection unit is disposed in the lighting device according to the embodiment of the present invention, an image or character having a three dimensional feeling may be generated, and this may be further enhanced by adjusting transmissivity of the half mirror member, and such a three dimensional feeling may be further variously provided by forming the above-described shapes or arrangement structures of the reflection unit and the optical pattern layer.

The lighting device according to the embodiment of the present invention may be applied to various lamp apparatuses such as a vehicle lamp, a household lighting device, and an industrial lighting device that require lighting. For example, in a case in which the lighting device is applied as a vehicle lamp, the lighting device may be applied as a headlight, a vehicle interior lighting, a door scuff, a backlight, or the like. In addition, the lighting device according to the embodiment may also be applied to the field of a back light unit applied to a liquid crystal display apparatus and in addition, may also be applied to a field related to lighting which is developed and commercialized or can be realized according to technical development in the future.

In the detailed specification of the present invention, specific embodiments have been described above. However, various modifications may be made without departing from the scope of the present invention. The technical spirit of the present invention should not be defined by the described embodiments of the present invention and should be defined by the claims and equivalents thereof.

The invention claimed is:

1. A lighting device comprising:
a first light source including a plurality of light emitting elements;
a second light source disposed opposite to the first light source and including a plurality of light emitting elements;
a first conversion unit disposed on a path of light emitted from the first light source;
a second conversion unit disposed on a path of light emitted from the second light source;
a reflection unit disposed between the first conversion unit and the second conversion unit; and
a half mirror member spaced apart from the reflection unit,
wherein light emitted from the first light source and passing through the first conversion unit is reflected by the reflection unit, and
wherein a height of a central portion of the reflection unit is greater than a height of both edges of the reflection unit.

2. The lighting device of claim 1, wherein the reflection unit comprises a first side surface disposed between the center portion and one edge of the both edges, and a second side surface disposed between the center portion and the other edge of the both edges, wherein each of the first side surface and the second side surface has a flat or curved surface structure.

3. The lighting device of claim 2, wherein a vertical cross section of the reflection unit comprises a semicircular structure.

4. The lighting device of claim 2, wherein a vertical cross section of the reflection unit comprises a triangular structure.

5. The lighting device of claim 2, wherein the reflection unit has a structure in which a space is formed on an inner side surface of the reflection unit.

6. The lighting device of claim 1, wherein the first conversion unit and the second conversion unit comprise a diffusion member and an optical pattern member, wherein the diffusion member and the optical pattern member are disposed so that light emitted from the first light source and the second light source passes through the optical pattern member after passing through the diffusion member.

7. The lighting device of claim 6, wherein the both edges of the reflection unit are disposed so as to be in contact with the optical pattern member.

8. The lighting device of claim 7, wherein the optical pattern member is configured to selectively transmit the light emitted by the first light source and the second light source.

9. The lighting device of claim 8, wherein the optical pattern member comprises a plurality of optical patterns, and
wherein shapes of the optical patterns include triangular, tetragonal, or circular shapes.

10. The lighting device of claim 9, wherein the plurality of the optical patterns is formed in a structure penetrating one region of the optical pattern member.

11. The lighting device of claim 10, wherein a size of each optical pattern of the plurality of the optical patterns is different.

12. The lighting device of claim 1, wherein a first portion of the light reflected by the reflection unit passes through the half mirror member, and a second portion of the light reflected by the reflection unit is reflected from the half mirror member to the reflection unit.

13. The lighting device of claim 6, wherein the both edges of the reflection unit are disposed so as to be in contact with the optical pattern member.

14. The lighting device of claim 1, wherein the central portion of the reflection unit is spaced apart from a lower surface of the half mirror member.

15. A vehicle lamp comprising the lighting device of claim 1.

* * * * *